Oct. 4, 1966 H. B. DIAMANT ETAL 3,277,445

ELECTRONIC MEMORY ATTACHMENT FOR ACCOUNTING MACHINES OR THE LIKE

Filed Feb. 23, 1962 9 Sheets-Sheet 1

INVENTORS
H. B. DIAMANT
P. F. EILAND

BY Roy C. Hopgood

ATTORNEY

INVENTORS
H. B. DIAMANT
P. F. EILAND
BY Roy C. Hopgood
ATTORNEY

INVENTORS
H. B. DIAMANT
P. F. EILAND
BY
Roy C. Hopgood
ATTORNEY

INVENTORS
H. B. DIAMANT
P. F. EILAND
BY Roy C. Hopgood
ATTORNEY

INVENTORS
H. B. DIAMANT
P. F. EILAND
BY
Roy C. Hopgood
ATTORNEY

INVENTORS
H. B. DIAMANT
P. F. EILAND
BY
Roy C. Hopgood
ATTORNEY

INVENTORS
H. B. DIAMANT
P. F. EILAND
BY
Roy C. Hopgood
ATTORNEY

INVENTORS
H. B. DIAMANT
P. F. EILAND
BY Roy C. Hopgood

INVENTORS
H. B. DIAMANT
P. F. EILAND
BY
Roy C. Hopgood
ATTORNEY

United States Patent Office 3,277,445

Patented Oct. 4, 1966

3,277,445

ELECTRONIC MEMORY ATTACHMENT FOR ACCOUNTING MACHINES OR THE LIKE

Henri B. Diamant and Phillip F. Eiland, Jr., both of 1142 Old Boalsburg Road, State College, Pa.

Filed Feb. 23, 1962, Ser. No. 175,008
19 Claims. (Cl. 340—172.5)

This invention relates in general to electronic memory circuits and in particular to digital computer circuits which are adapted to store and to perform numerical operations on sequentially coded digital input signals. The invention can be used in any data processing system which employs sequentially coded digital signals, but it is particularly useful in systems where the sequentially coded input signals are derived from punched cards which are read in a card reader such as found, for example, in accounting machines or the like.

As shown in FIGS 1A through 1E of the attached drawings; most prior art accounting machines use punched cards (FIG. 1A) which are divided into 12 rows and 80 or more columns. Each column on the card represents a unit of information, e.g. a decimal number or a letter of the alphabet, and each unit of information is identified by one or two holes punched along selected rows in the column corresponding thereto. Numbers are represented by a single hole punched in one of ten digit rows on the card, and letters are represented by two holes, one hole being punched in one of three letter zone rows which divide the alphabet into three letter groups, and the other hole being punched in one of the digit rows to idenify the particular letter in the letter group selected by the first mentioned hole. The numbers and letters punched on the card can be arranged to represent any desired information, but in many accounting machines the information is concerned with commercial transactions such as indicated in the card of FIG. 1A.

The information contained in the punched cards is translated into sequentially coded digital signals by passing the card under a set of card-reading brushes such as indicated in FIG. 1B. The card-reading brushes contains an individual brush for each column of the card, and the electrical circuit to each individual brush closes to generate a pulse whenever a punched hole passes under the brush. The passage of the card under the brushes is timed so that the time of occurrence of the pulses at the individual brushes indicate the row corresponding to the punched hole on the card and therefore indicates the information contained therein.

The accounting machine usually contains a plurality of card-reading brushes arranged to form a multiple reading station assembly such as indicated schematically in FIGS. 1C and 1D. FIG. 1C shows a three-station card-reading system such as used, for example, in the IBM 403 accounting machine and FIG. 1D shows a two-station card-reading system such as used, for example, in the IBM 402 accounting machine. As indicated in these figures, the punched cards are fed in sequence past the card-reading brushes from a card feed hopper and are deposited in a card stacker when the reading operation is completed. The information read from the punched cards is applied to other accounting machine circuit units, such as shown in FIG. 1E, which are adapted to print out the information punched in the cards and to accumulate and print out totals or subtotals of numbers punched in the cards. For flexibility of application, the input and output signal conductors to the various units of the accounting machine are brought out to hubs on a program board so that the accounting machine can be programmed for a wide variety of functions by connecting jumper wires between various hubs on the board in accordance with the desired operation or sequences of operation. By means of appropriate inter-wiring on the program board, the same accounting machine can be programmed to print out many different commercial accounting forms, such as invoices, withholding statements, customer statements, cash requirements statements, cash disbursement forms, expense distribution forms, commission statements, sales analysis forms, stock status summary forms, and many others.

Although these prior art accounting machines are quite effective in carrying out their multiple operations, they are seriously limited with regard to the type and number of operations which they can perform because they contain only the most rudimentary of memory systems. The memory capability of these prior art accounting machines is limited to the accumulation of totals in mechanical counters, which are very poor storage elements because of their size, weight, and excessively slow speed of operation. For example, the IBM 402 and 403 accounting machines contain a maximum of sixteen mechanical counters, only four of which are adapted to accumulate 8 digit decimal numbers. The remaining twelve counters are adapted to accumulate 6, 4, and 2 digit decimal numbers. It will be apparent that this is an extremely limited storage capacity in light of the fact that electronic storage devices can accumulate over two thousand 10 digit numbers in less space than required for the sixteen mechanical counters. Furthermore, the electronically stored numbers can be entered, transferred, added, or subtracted in a fraction of the time required for the same operations with mechanically stored numbers. A ten digit decimal number can be read out of an electronic storage element in microseconds as compared to a read out time of many milliseconds for the same number in a mechanical storage element. These advantages have been clearly recognized by manufacturers of accounting machines, and many of the new accounting machines are incorporating electronic rather than mechanical storage systems.

The mechanical storage type of accounting machines are, however, still being manufactured and they are in wide use throughout the world today. Since these machines are quite expensive they cannot in general be scrapped just because their memory system is not as good as it might be. Therefore they will remain in operation for many years to come even though they may be superseded by accounting machines which utilize electronic storage instead of mechanical storage.

Accordingly, one principal object of this invention is to provide an electronic memory attachment to augment the storage capacity of a limited storage accounting machine or the like.

Another principal object of this invention is to provide an electronic memory attachment which can be used to augment the storage capacity of a prior art accounting machine or the like and to extend the range of functions that can be performed thereby without requiring any changes or modifications in the accounting machine or its operating cycle.

A further principal object of this invention is to provide an electronic computer circuit which is adapted to store sequentially coded input signals such as generated in accounting machines or the like and to perform numerical or logical operations on those input signals.

Other principal objects and advantages of the invention will become apparent to those skilled in the art, along with numerous secondary objects and advantages thereof, from the following description of several specific embodiments thereof, as illustrated in the attached drawings, in which:

FIG. 6 is a schematic circuit diagram of one suitable mechanization of the input-output synchronization and number control circuits of FIG. 2C;

Although this invention can be used in connection with any data processing system which uses sequentially coded digital signals, it is particularly useful in connection with accounting machines such as exemplified in FIGS. 1A through 1E of the drawings.

Figures 1A, 1B, 1C, 1D:
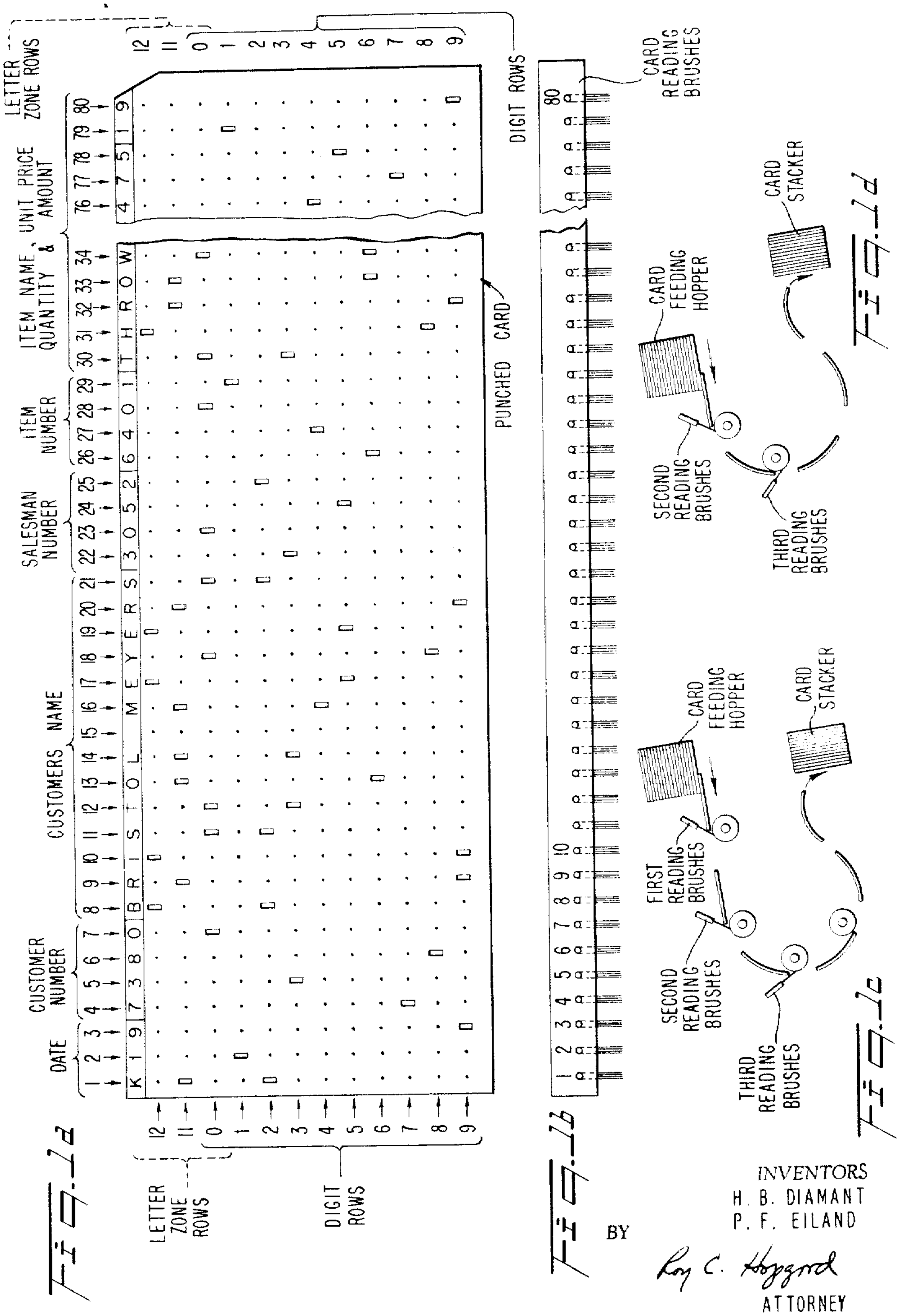
FIG. 1A is a plan view of a punched card such as used in connection with prior art accounting machines.
FIG. 1B is a plan view of a set of card-reading brushes such as used in prior art accounting machines.
FIG. 1C is a schematic representation of one multiple station card-reading system used in prior art accounting machines.
FIG. 1D is a schematic representation of a second multiple station card-reading system used in prior art accounting machines.
Figure 1E:
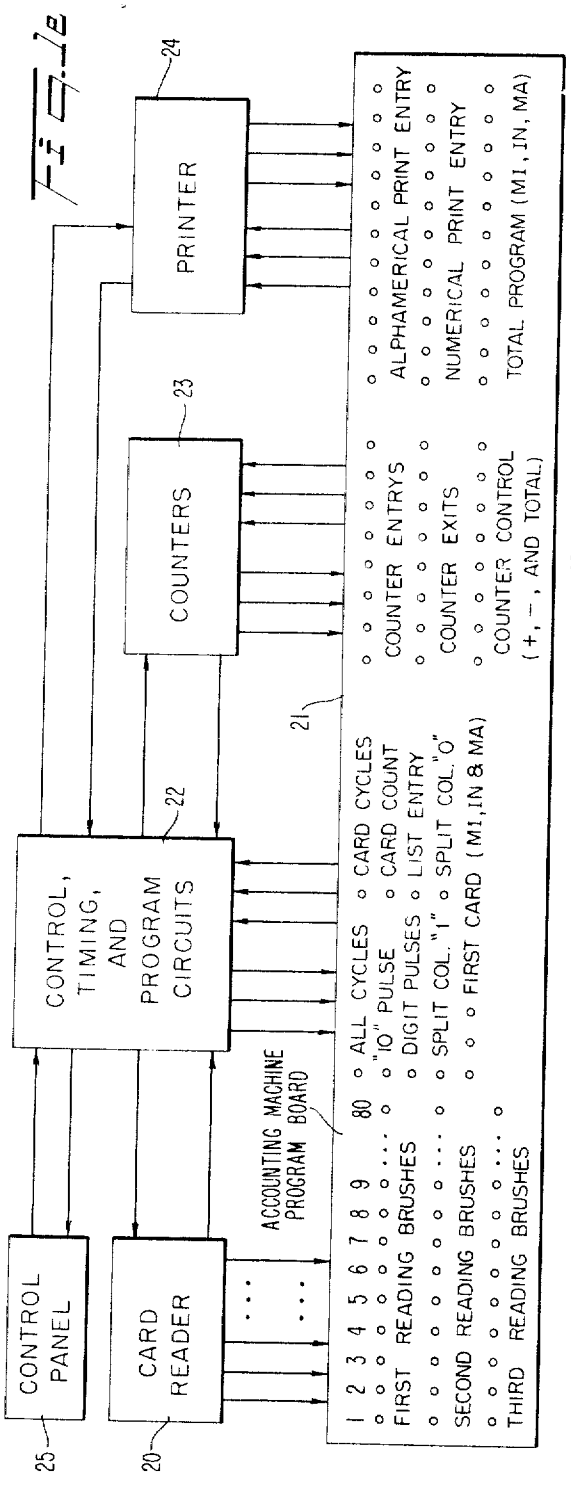
FIG. 1E is a general block diagram of one illustrative prior art accounting machine.

FIG. 1E is a generalized block diagram of one illustrative prior art accounting machine. This machine contains a card-reader 20 which is adapted to generate sequentially coded signals from punched cards such as shown in FIG. 1A by means of card-reading brushes such as shown in FIGS. 1B, 1C, and 1D. The output of card-reader 20 is applied to a series of output hubs on an accounting machine program board 21 which also receives signals from control, timing, and program circuits 22, counter 23, and printer 24. The accounting machine can be programmed to perform various functions by means of inter-connections made on program board 21 in accordance with well known prior art programming techniques. Although the terminology used on program board 21 corresponds to terminology used on the IBM type 402, 403 and 419 accounting machines, it will be understood by those skilled in the art that equivalent signal input and output hubs are available on other types of prior art accounting machine, and that the particular terminology of FIG. 1E is used only by way of presenting a concrete example. When the desired program has been wired on program board 21, the accounting machine is put into action via a control panel 25, which contains a start button and other manual controls for the accounting machine as a whole. In most cases, the accounting machine program is carried through automatically after it has been initiated by manual switch control panel 25 without any further attention from the operator.

Figure 2D:
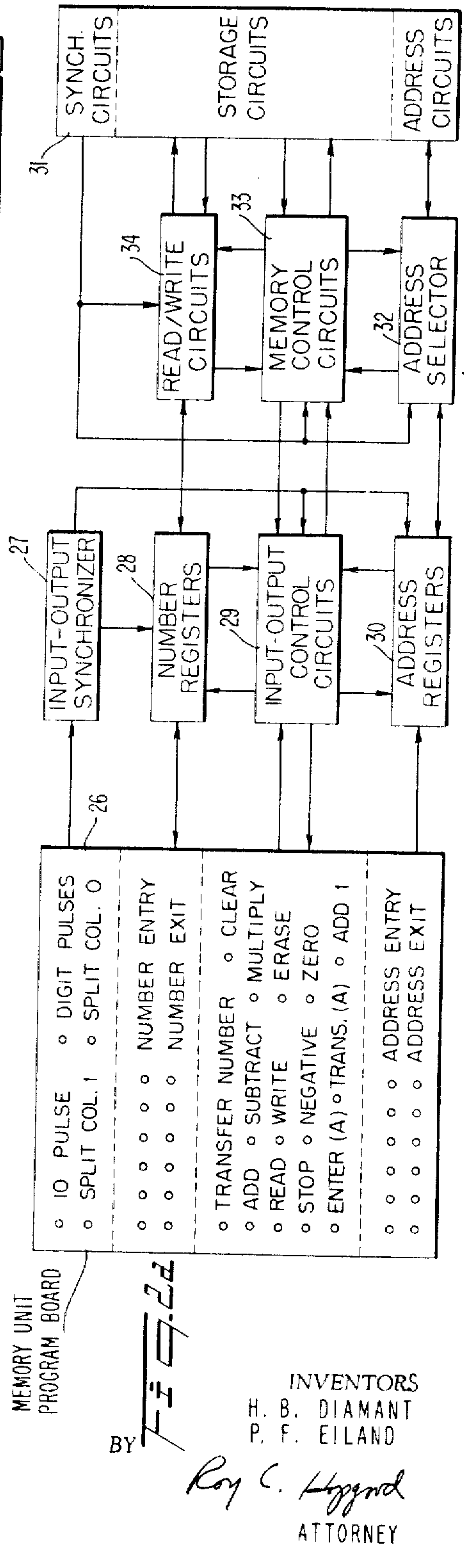
FIG. 2A is a general block diagram of one embodiment of this invention which is adapted for use in connection with the accounting machine of FIG. 1E.
FIG. 2B is a timing chart showing one suitable method of synchronizing the embodiment of FIG. 2A with the accounting machine of FIG. 1E without any modifications in the accounting machine or its operating cycle.
FIG. 2C is a more detailed block diagram of the embodiment of FIG. 2A.
Figure 2B:
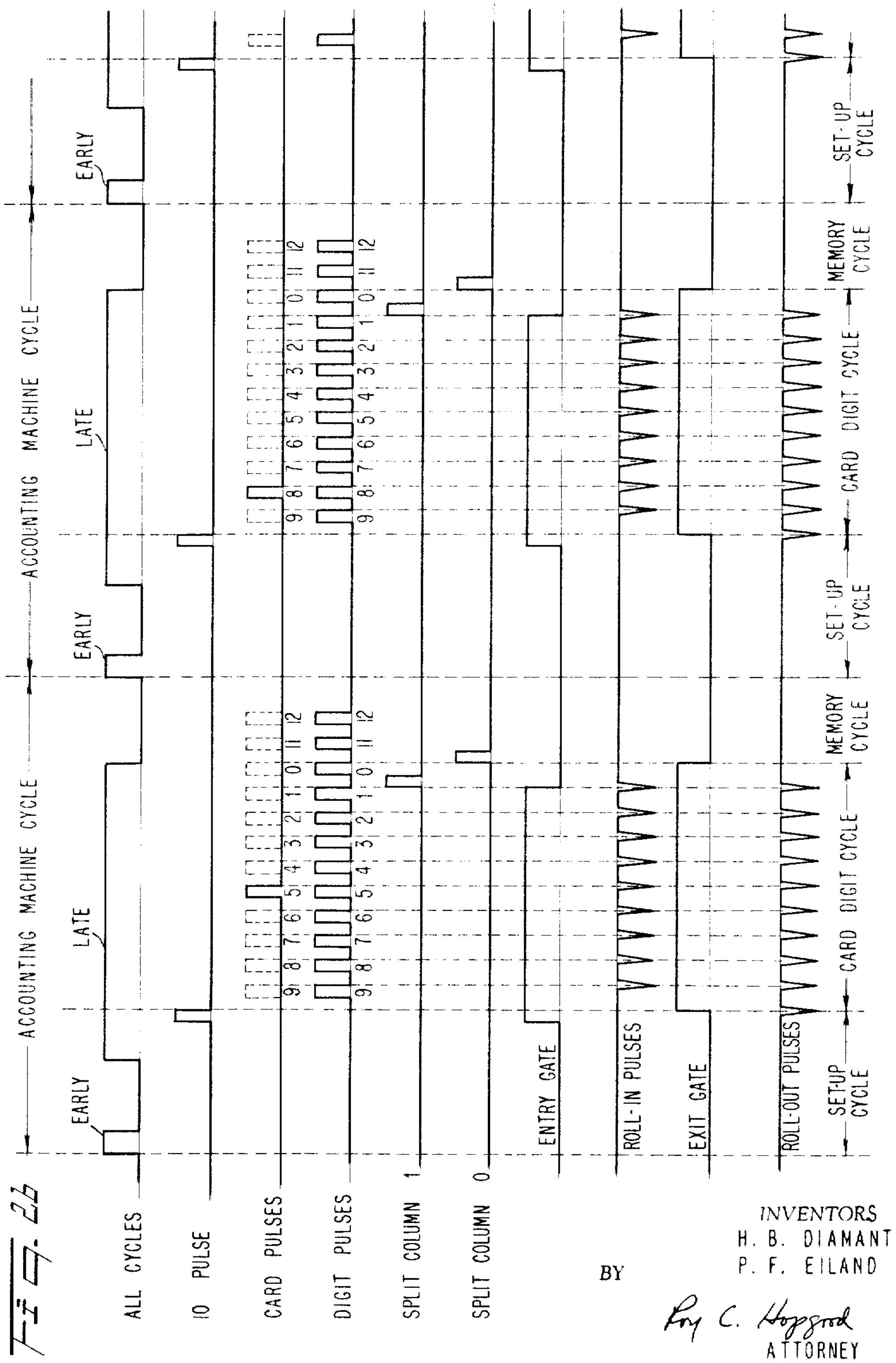
Figure 2A:
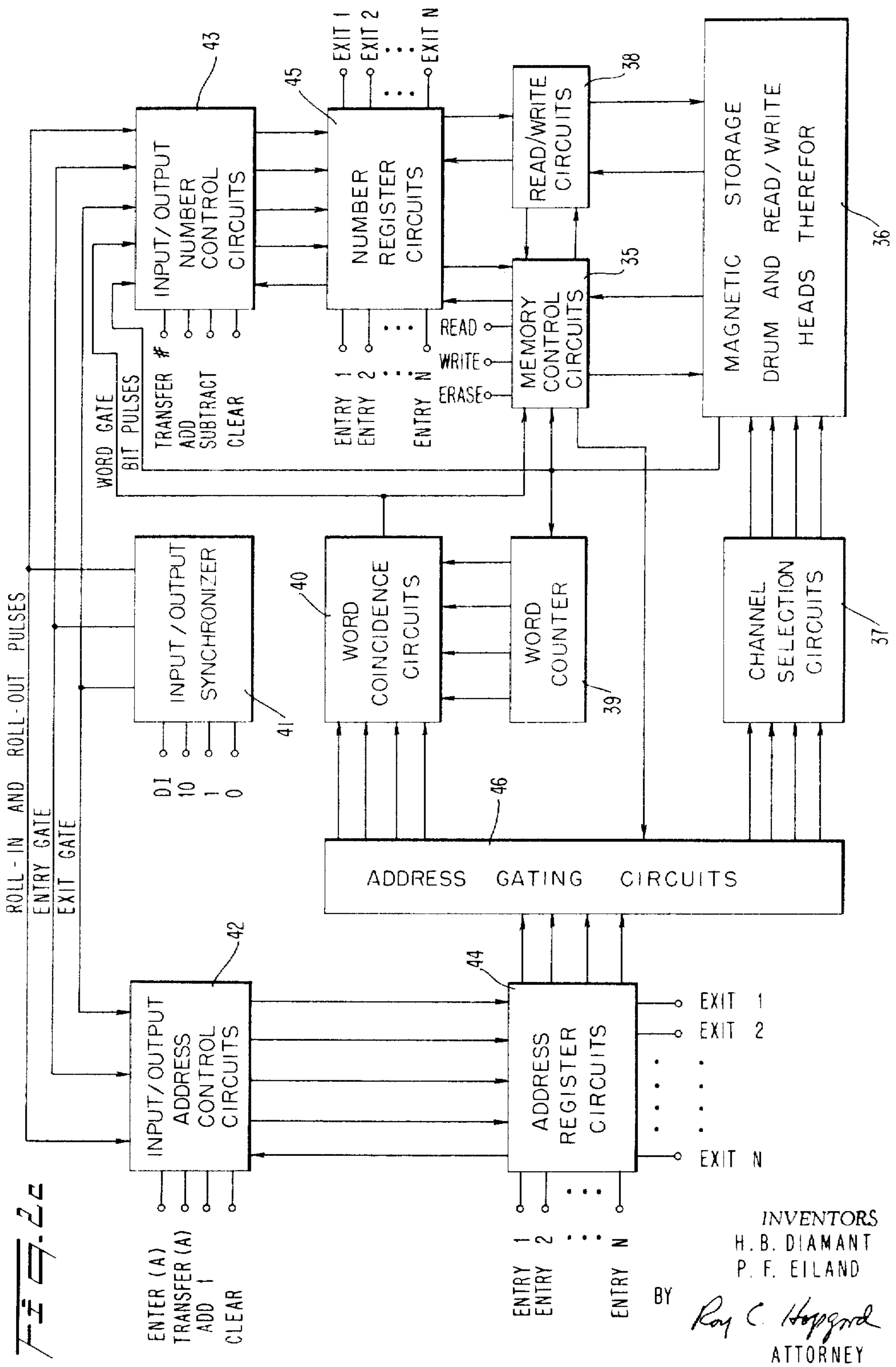
Figure 4:
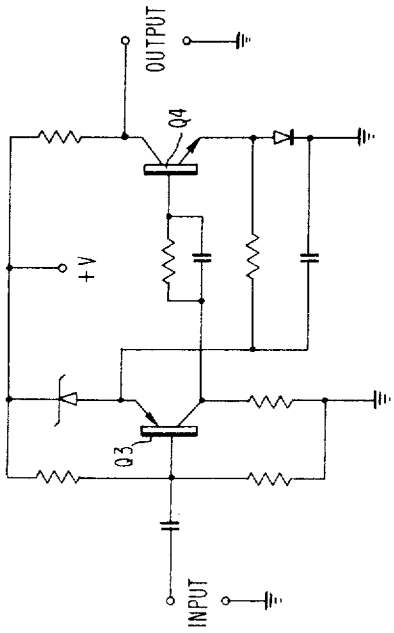
FIG. 4 is a schematic circuit diagram of one suitable non-inverting pulse amplifier that can be used in mechanizing the embodiment of FIG. 2C.

FIG. 2*a* is a general block diagram of an embodiment of this invention which is adapted for use in connection with prior art accounting machines as described above. This embodiment of the invention contains a memory attachment program board 26 which is adapted to receive input signals from accounting machine program board 21 and to couple signals thereto via jumper wires such as normally used in setting up the accounting machine program on board 21. The signal input and output hubs on memory attachment program board 26 are shown to be divided into four general classes: a group of timing signals which are coupled to a synchronizer 27 to synchronize the operation of the memory unit with the operation of the accounting machine; a group of number input and output signals which are coupled to number registers 28, which are adapted to receive and to accumulate sequentially coded input signals; a group of control input and output signals which are applied to control circuits 29 to select various modes of operation for the memory attachment; and a group of address input and output signals which are applied to address registers 30 to identify the counter input and output signals. The address input signals are used to select and to identify a specific location in memory circuits 31 via address selector 32. After a memory storage location has been so selected, digital signals can be written into or read out of that location by means of read/write circuits 34, which are coupled to number registers 28. The transfer of information into or out of memory circuits 31 is timed by memory sync circuits associated therewith. Thus it will be seen that two different synchronizing circuits are used in this invention: a first synchronizing circuit which controls the transfer of information between the accounting machine and the memory attachment input-output circuits, and a second synchronizing circuit which controls the transfer of information between the input-output circuits and memory circuits 31. Both synchronizing circuits are adapted to allow all of the memory attachment functions to be performed in synchronism with the accounting machine cycle so that the accounting machine cycle does not have to be delayed or altered in any way to accommodate the memory attachment. One suitable method of achieving this synchronization is disclosed more clearly in the chart of FIG. 2B, which shows the timing signals generated by the accounting machine and by one illustrative input-output synchronizer of this invention.

Referring to FIG. 2B, the accounting machine cycle is started by an "all-cycles" pulse, which is divided into an "early" and a "late" portion. Each accounting machine cycle is divided into a "setup cycle," in which the accounting machine is prepared to perform its programmed operation, a card-reading cycle, in which the information stored on a card is read into the machine, and a functional cycle, in which the information read out of the card is added in the accounting machine counter or printed out in the accounting machine printer or compared to the other information in the accounting machine comparison circuits. In the memory attachment, the card reading and functional cycles are further divided into a "card digit cycle" and "memory cycle," as will be explained later. The "setup cycle" starts at the leading edge of the "early all-cycle" pulse and terminates on the trailing edge of a "10-pulse," which is triggerd by the "late all-cycles" pulse to start the card-reading cycle and function cycle of the accounting machine. After the "10-pulse" has been generated, the accounting machine generates a time sequence of "digit pulses" each of which corresponds to the position of one row of the punched cards. If a hole has been punched in one of the card rows, that hole will generate a "card pulse" in coincidence with the corresponding "digit pulse." In the first accounting machine cycle of FIG. 2*b*, a "card pulse" has been generated in coincidence with the fifth "digit pulse," which indicates that a hole has been punched in the five row on the card being read at that time. In the second accounting machine cycle, a hole has been punched in the eight row of the following card to generate a "card pulse" in coincidence with the eighth digit pulse. As explained earlier, the zero through nine rows of the punched cards are used to designate numerical information when only one hole is punched in a column of the card but are used to designate alphabetical information when two holes are punched. The second hole is always punched in one of the letter zone rows (zero, eleven or twelve) and since these rows are not used for numerical information, the portions of the card-reading cycle covering those rows can be used to perform information transfer and numerical operations in the memory attachment. Therefore, in accordance with one timing sequence of this invention, the functions of the memory attachment are carried out in the time period between the zero "digit pulse" and the following "early all-cycles" pulse. This time is conveniently indicated by the "split column 1" and "split column 0" output pulses from the accounting machine, which occur respectively between the one and zero "digit pulses" and the zero and eleven "digit pulses" of the accounting machine. In the memory attachment, the card reading and functional cycle of the accounting machine is divided up into a "card digit cycle," in which the memory attachment receives information from or delivers information to the accounting machine, and a "memory cycle," in which information is transferred into or out of the memory circuits.

In the "card digit cycle," the memory attachment is adapted to receive input information from and to apply output information to the accounting machine by means of "roll-in pulses" and "roll-out pulses," which are derived from the digit pulses of the accounting machine, and an "entry gate" and "exit gate" which are started by the "10-pulse" and terminated respectively by the "split column 1" and "split column 0" pulses of the accounting machine. The "exit" and "entry" gates are staggered in time so that 9 "roll-in pulses" and 10 "roll-out pulses" will be generated. This difference in the number of roll-in and roll-out pulses is provided for a particular counter register which will be described in detail in a later paragraph. The entry and exit gates, taken together, define the time period in which synchronizer 27 controls the operation of the memory attachment. When the entry and exit gates both end, the operation of the memory attachment is controlled by the memory sync circuits, which are much faster than synchronizer 27, so that all of the memory and data processing functions of the memory attachment can be executed in the time period between the split column zero pulse of the accounting machine and the following early pulse cycle pulse. This split timing arrangement is important because in the first place it allows the memory attachment to receive signals from and transfer signals into existing prior art accounting circuits without any modifications thereof, and in the second place it allows the memory attachment to perform all of its memory and data processing functions without any interruption in the normal prior art accounting machine operating cycle. Thus the memory attachment of this invention can be used to augment the storage capacity and extend the operational capabilities of the prior art accounting machines without affecting the normal operation or the normal structure thereof in any way.

FIG. 2C shows one specific embodiment of the invention which is adapted for operation in connection with the exit gate, entry gate, roll-in pulses, and roll-out pulses described above in connection with the chart of FIG. 2B. This particular embodiment of the invention, which belongs to the general class of embodiments shown in FIG. 2A, contains a multiple channel magnetic drum storage circuit 36, which is adapted to store a large number of binary words on a plurality of drum storage channels, each channel of which contains a plurality of binary words. Magnetic storage drum circuit 36 is fitted with a separate read/write head for each channel thereof, and any desired channel of the drum can be energized for reading or for writing by means of channel selection circuits 37, which operate to connect the desired read/write head to a common read/write circuit 38. After the desired channel has been selected, the desired word location thereon is detected by means of bit pulses which are generated in the magnetic drum circuit as the drum is revolved. Each word location of the channel contains some predetermined number of bits, and therefore the storage location which is under the read/write heads at any time can be conveniently detected by counting the bit pulses in a word counter 39, which changes its state for each group of bits corresponding to one word. The state of word counter 39 is compared to the selected word location in word coincidence circuits 40, which produces a word gate output signal whenever the output code from word counter 39 coincides with the code of the selected word location. This word gate signal is used to enable the read/write circuits so that the information stored in the selected word location on the selected channel can be read out or changed by means of read/write circuit 38.

This embodiment of the invention is adapted to receive sequentially coded signals from accounting machines or the like by means of synchronizer circuits 41, which receive the digit impulses, 10 pulse, split column 1 pulse, and split column 0 pulses from the accounting machine and which produces an exit gate, entry gate, roll-in pulses, and roll-out pulses such as shown in the charts of FIG. 2B. These signals are applied to address control circuits 42 and number control circuits 43, which control the operation of address register circuits 44 and number register circuits 45 respectively. Address register circuits 44 receive sequentially coded address digits on entry hubs 1 through N and translate the sequential code into a parallel code which is applied to channel selection circuits 37 and word coincidence circuits 40 via address gating circuits 46. As will be readily apparent to those skilled in the art, address gating circuits 46 divide the address code word into two parts; a channel number, which signifies the memory channel containing the desired storage location, and a word number, which signifies the position of the desired storage location within the selected channel. The code used for the word number must, of course, correspond to the code used in word counter 39 in order to detect coincidence between the desired storage location and the storage location which is under the reading heads at any given time.

Address register circuits 44 are either single stage or dual stage circuits depending on whether serial or parallel adder circuits are used in mechanizing this embodiment of the invention. When serial adder circuits are used, an addition operation can be performed in one accounting machine cycle, whereby the address and number input signals can be taken from the same card reading station. With parallel adder circuits, however, two accounting machine cycles are required to perform the addition operation. In the first accounting machine cycle the address is entered into the memory attachment, and in the following accounting machine cycle the number is entered into the memory attachment. This requires that address register circuits contain two address registers, a first address register and a second address register, and that the address be transferred from the first to the second address register at the end of each accounting machine cycle.

The operation of the described embodiment of the invention will be better understood from a discussion of the functions it is adapted to perform, since the details of logical circuits are more readily grasped after the overall function of the circuit is understood. Suppose, for example, that it is desirable to accumulate and to print out the total amount of all items sold to each of a group of customers in a given month. Suppose further that a large group of sales cards such as shown in FIG. 1A are put into a prior art accounting machine and that the accounting machine is programmed to print out a sales analysis by customer and item number with the accounting machine counter being used to accumulate totals by item number and customer in accordance with well known prior art accounting machine programming practices. The desired accumulation and storage of the total sales to the individual customers can then be carried out in the memory attachment during the normal accounting machine cycle by the following interconnections between the accounting machine and the memory attachment, which in this example uses parallel adder (dual address register) circuits. The customer number hubs of the second card reading brushes (brushes 4, 5, 6 and 7 in FIG. 1E) are wired to the address input hubs of memory unit program board 26. The amount numbers, which are entered in columns 76 through 80 of the card in FIG. 1A, are wired from the corresponding hubs of the third reading brushes of accounting machine program board 21 to the number entry hubs of the memory attachment program board 26. A "card cycles output" signal is then wired from accounting machine program board 21 to the "add," "write" and "read" hubs of memory attachment program board 26. (The card cycles signal from the accounting machine of FIG. 1E is identical with the all-cycles signal shown in FIG. 2B). With this simple interwiring, the memory attachment will automatically carry out the desired accumulation of totals while the accounting machine is running through its normal cycle to print out the sales analysis form described above. Referring to the timing chart of FIG. 2B and the block diagram of FIG. 2C, the operation of the memory attachment proceeds according to the following sequence:

A. When the first card of the group passes the second reading brushes, the address number punched in the customer number columns thereof is entered into the first address register, which is adapted to automatically clear itself before each address entry.

B. While the first card is passing from the second reading brushes in the accounting machine to the third reading brushes therein, the address number is transferred from the first address register into the second address register, and then the number entered at that address in magnetic storage drum 36 is transferred into number register 45 via read/write circuit 38.

C. When the first card passes the third reading brushes of the accounting machine, the amount number punched thereon is added to the amount previously entered in number register 45 during step B above. The resultant sum remains stored in register 45 until the next memory cycle, when it will be transferred to magnetic drum 36.

D. While the first card is passing under the third reading brushes, the second card of the group will simultaneously be passing under the second reading brushes, and therefore while the addition process of step C is taking place a new address will be entered into the first address register 42. This new address, of course, will be the customer number punched in the second card of the group.

E. In the second memory cycle, the number stored in number register 45 at the end of the addition process is written onto magnetic drum 36 at the address then stored in the second address register. It will be understood that the number so entered is the sum of the amount number punched on the first card of the group and the number previously stored on the magnetic drum at the address corresponding to the customer number of that same card.

F. After the total in number register 45 has been written onto the drum at the customer number of the first card, the new address number is transferred to the second address register, then the amount entered on the drum at the new address is transferred from the storage drum into counter register 45 in preparation for another addition cycle.

G. When the second card of the group passes under the third reading brushes, the amount punched thereon is added to the amount entered in counter register 45, as described above in step C, while at the same time the customer number punched in the third card of the group is entered into new address register as in step D above.

H. In the memory cycle which follows, the contents of counter register 45 is again written into the drum at the old address, which now corresponds to the customer number on the second card of the group, and the number stored in the drum at the new address is then transferred into counter registers 45 in preparation for a third addition cycle. The new address is then transferred into the second address register.

I. The above described sequence is repeated continuously for each accounting machine cycle, with the result that a running total of all of the amounts charged to each customer is accumulated and stored on the memory drum by customer number. Thus when the normal accounting machine program has been completed, the memory drum will contain the desired cumulative totals with each total thereof being identified by a customer number.

The information which has been stored in the memory drum during the above described accounting machine program cycle can be read out in several ways. In accordance with one method, a group of print-out cards are prepared, each card containing a customer number and customer name code. The accounting machine is then programmed to print out the information that it receives during each card cycle, and the number exit hubs of memory attachment program board 26 are wired to the "numerical print entry" of accounting machine program board 21. The "card cycles" signal from accounting machine program board 21 is wired to the "transfer number" hub and the "read" hub of the memory attachment program board 26. The readout process with this particular wiring then proceeds as follows:

A. When the first card of the readout card group passes the second reading brushes, the address customer number thereon is entered into the first address register. In the memory cycle which follows the address is transferred into the second address register, and the number stored on the drum at that address is transferred into number register 45 via read/write circuit 38.

B. When the first card passes the third reading brushes, the contents of number register 45 are transferred out of the counter output hubs of memory attachment program board 26 into the numerical print entry of accounting machine program board 21. At the same time, the alphabetical information stored in the customer named columns of the readout card is transferred into the alphamerical print entries of accounting machine program board 21, in accordance with well known prior art programming techniques, and the customer name, customer number, and total amount for all items sold to the customer on the previously recorded sales analysis is then simultaneously printed out in printer 24 of the accounting machine.

C. While the first readout card is passing under the third reading brushes the second read-out card will be passing under the second reading brushes, thus while the information relative to the first card is being printed on printer 24, the customer number of the second card is entered in the first address register. In the second memory cycle, the total stored on the memory drum at the new address is transferred into counter registers 45 in preparation for a second readout which will occur when the second card passes the third reading brushes.

D. This process is repeated until all of the readout cards have gone through the machine, at which time all of the totals stored on the memory drum will have been printed out by printer 24 alongside of the corresponding customer name and any other information that might have been punched on the read-out cards to identify the particular items or periods of time represented by the accumulated totals. With the readout cards, it should be noted that it is not necessary to arrange the cards sequentially by customer number; this readout process will work just as well if the readout cards are arranged in random order.

In accordance with another readout procedure, the memory attachment can be programmed to read out the numbers stored on the drum in sequence by the use of blank cards in the accounting machine rather than the readout cards described above. In this readout procedure, the first address register is operated as a cumulative counter which increases its count by one each time a card passes the reading brushes. This is done by wiring the "card count" hub of accounting machine program board 21 to the "add 1" hub of memory unit program board 26.

The above described sequences of operation are considerably simplified when serial addition is used in place of parallel addition. In this case the addition cycle is reduced to the following steps.

A. When the first card of the card group passes the second reading brushes, the customer number punched thereon is entered into the address registers and the amount number punched thereon is entered into the number registers.

B. In the memory cycle which follows, the number entered in the number register is added to the number stored in the memory at the same address, the sum thereof is written into the memory circuit at the same address, and the address registers and number registers are cleared to receive information from the next card.

C. Steps A and B are repeated for each card as it passes under the second card reading brushes, thereby adding the amount punched on each card to the number stored at the same address.

It can be seen, then, that the serial adder is preferable because it requires only a single card reading to perform its addition operation while the parallel adder requires two card readings for the same operation. And it should be noted that the above described accumulation and readout programs are only simple examples of the many possible programs for which the memory attachment of this invention can be programmed. Many other programs will become apparent from the following description of two suitable mechanizations for the embodiment of FIG. 2C. Thus the specific programs described above are by no means the only function that can be performed by the memory attachment of this invention; they are only concrete examples which are set forth for the purpose of clarifying the detailed description which follows.

Figure 3B:
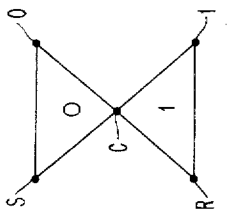
FIG. 3B is a block diagram symbol representing the flip-flop circuit of FIG. 3A.
Figure 3C:
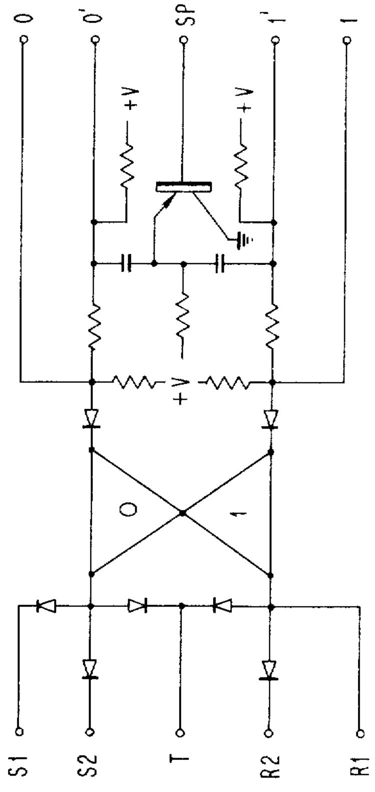
FIG. 3A is a schematic circuit diagram of one suitable flip-flop that can be used in mechanizing the embodiment of FIG. 2C.
Figure 3A:
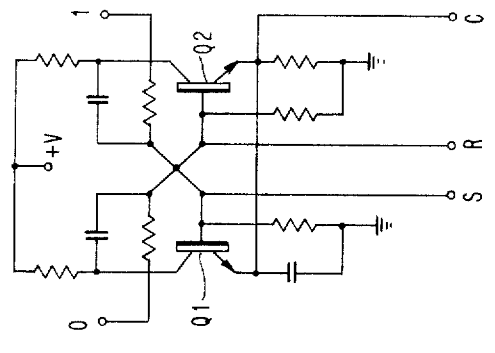
Figure 5B:
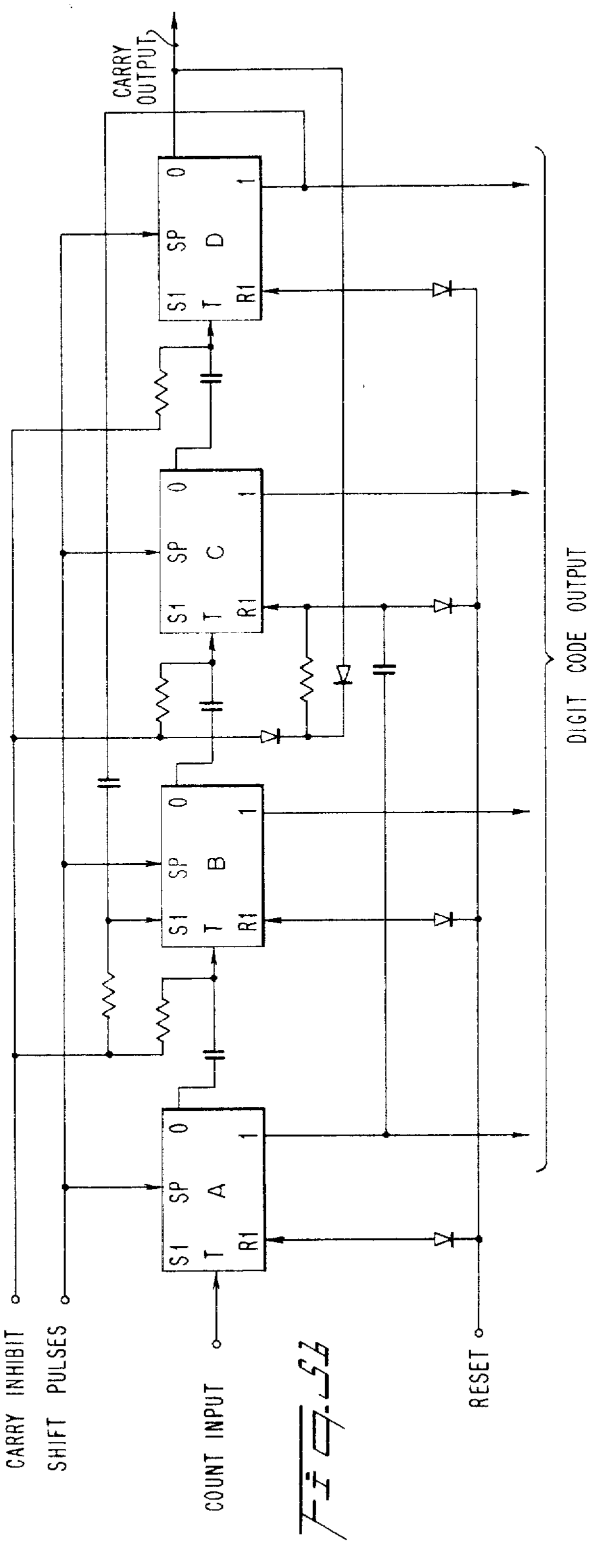
FIG. 5B is a partial schematic diagram of one suitable decade counter-shift register that can be used in mechanizing the embodiment of FIG. 2C.

FIGS. 3A, 3B, 4, 5A, 5B, and 5C are schematic diagrams of suitable flip-flop, non-inverting amplifier, and decade counter-shift register circuits which can be used in mechanizing the embodiment of FIG. 2C. The flip-flop circuit shown in FIG. 3A is a standard circuit whose operation will be apparent to those skilled in the art without further explanation. The symbol shown in FIG. 3B is a non-standard schematic symbol which is used to represent the circuit of FIG. 3A in the figures which follow. It will be noted that each corner or intersection on the symbol of FIG. 3B corresponds to a specific connection to the circuit of FIG. 3A. The operation of the non-inverting amplifier shown in FIG. 4 will also be apparent to those skilled in the art without explanation. This circuit is identified in the figures which follow by a box containing the letter R. Inverting amplifiers are identified by a box containing the letter A. FIG. 5A shows a suitable counter-shift register stage which can be used in the address and number registers of this invention. This stage comprises a flip-flop fitted with input triggering diodes and a shift output circuit. The flip-flop can be set by applying negative going pulses to the S1, S2, or T input terminals. It can be reset by applying negative going pulses to the R1, R2, or T input terminals. The direct output of the flip-flop is taken from output terminals 0 and 1, and a shift output pulse will appear on shift output terminals 0′ or 1′ when a negative going shift pulse is applied to shift input terminal SP. This shift output pulse, of course, will appear on terminal 0′ if the flip-flop is in its set state and on terminal 1′ if the flip-flop is in its reset state. When these register stages are connected together to form a shift register, shift output terminals 0′ and 1′ of one stage are coupled respectively to the S2 and R2 input terminals of the next stage and shift input pulses are simultaneously applied to the SP input terminals of each stage in the register. It will be noted that shift output terminals 0′ and 1′ are normally at a positive potential, which back biases the S2 and R2 trigger input diodes of the next stage in the register, and that the negative shift output pulses are only generated in response to a shift input pulse. The detailed operation of the shift output circuit will also be apparent to those skilled in the art from the circuit diagram thereof.

In accordance with the preferred mechanization of this invention, a plurality of register stages A through D (FIG. 5B) are coupled together to form a combined decade counter-shift register which is adapted to receive a decimal count input signal derived from the output signals of the accounting machine and a binary coded decimal shift input signal readout of the storage circuits of the memory attachment. Each of the stages A through D contains all of the input and output terminals shown in FIG. 5A, but in FIG. 5B the shift input and output connections have been omitted for the sake of clarity. It will be understood, however, that the shift output of each stage is coupled to the shift input of the next stage, as noted above in connection with FIG. 5A.

As shown in FIG. 5B, the 0 output of each stage is A.C. coupled to the T input terminal of the next stage, in accordance with well known counter principles, and feedback connections are provided to reduce the counter's natural 16 state cycle to a 10 state cycle and to provide a binary coded decimal output from the decade counter so formed. The counter circuit can be reset to its zero state by applying a negative pulse to a common reset conductor, which resets each stage through a corresponding triggering diode. The detailed operation of this decade counter will be readily understood by those skilled in the art without further explanation.

Figure 5C:
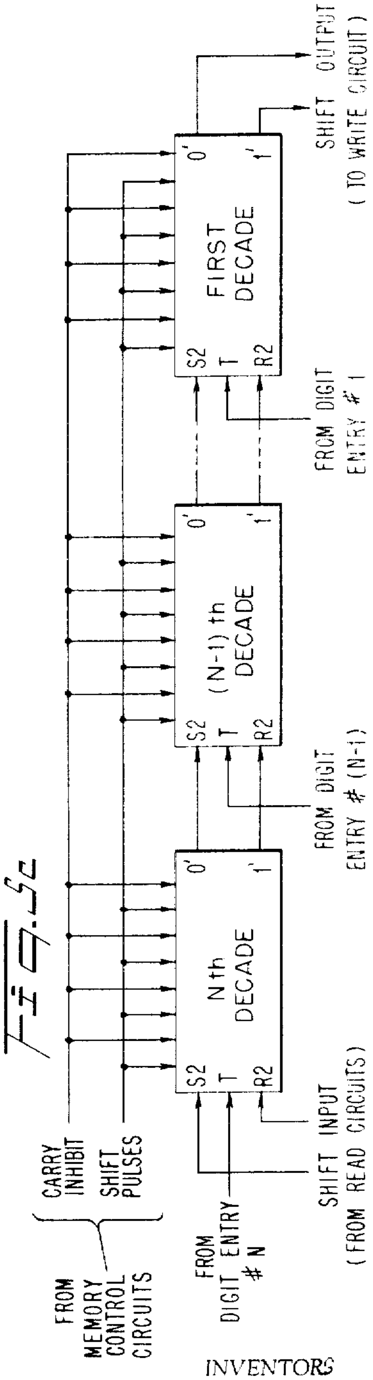
FIG. 5C is a partial schematic diagram showing the shift circuit for a plurality of decade registers such as shown in FIG. 5B.

A common carry inhibit conductor and a common shift pulse input conductor are coupled to each stage of the above described decade, and a positive carry inhibit gate is applied to the carry inhibit conductor to inhibit internal carries when the circuit is operated as a shift register. The inhibit and shift pulse input conductors are also common to each decade in the register formed therefrom, which is shown in FIG. 5C, and the shift output terminals of the last stage in the decades are coupled to the shift input terminals of the first stage of the next decade in the register. Binary coded decimal numbers containing N digits are shifted into the register from the reading circuit of the magnetic storage drum and out of the register into the writing circuit of the magnetic drum as indicated in FIG. 5C. The decimal digit pulses, however, are applied independently to each decade of the register from a corresponding digit entry circuit, which will be described later.

The above described counter-shift register circuit can be operated in either a parallel or a serial adder mode of operation, as indicated previously. In the parallel addition mode of operation, the binary coded decimal number stored at the selected address is first shifted into the register as a whole. The individual decimal digits punched in the card containing the selected address are then counted in on top of the binary coded decimal digits in the individual decades. This produces a binary coded decimal sum of each pair of digits and a decade carry output signal if the sum exceeds 10. The decade output carries are stored until the count input is finished, and then transferred to the next decade in the register by means which will be described later. After the carry signals have been transferred, the register will contain the sum of the number shifted in from the memory drum and the number counted in from the accounting machine. This sum can be shifted into the memory to replace the BCD number previously stored at the selected address, and it can also be counted out as a sequentially coded decimal number in the accounting machine code.

Figure 8A:
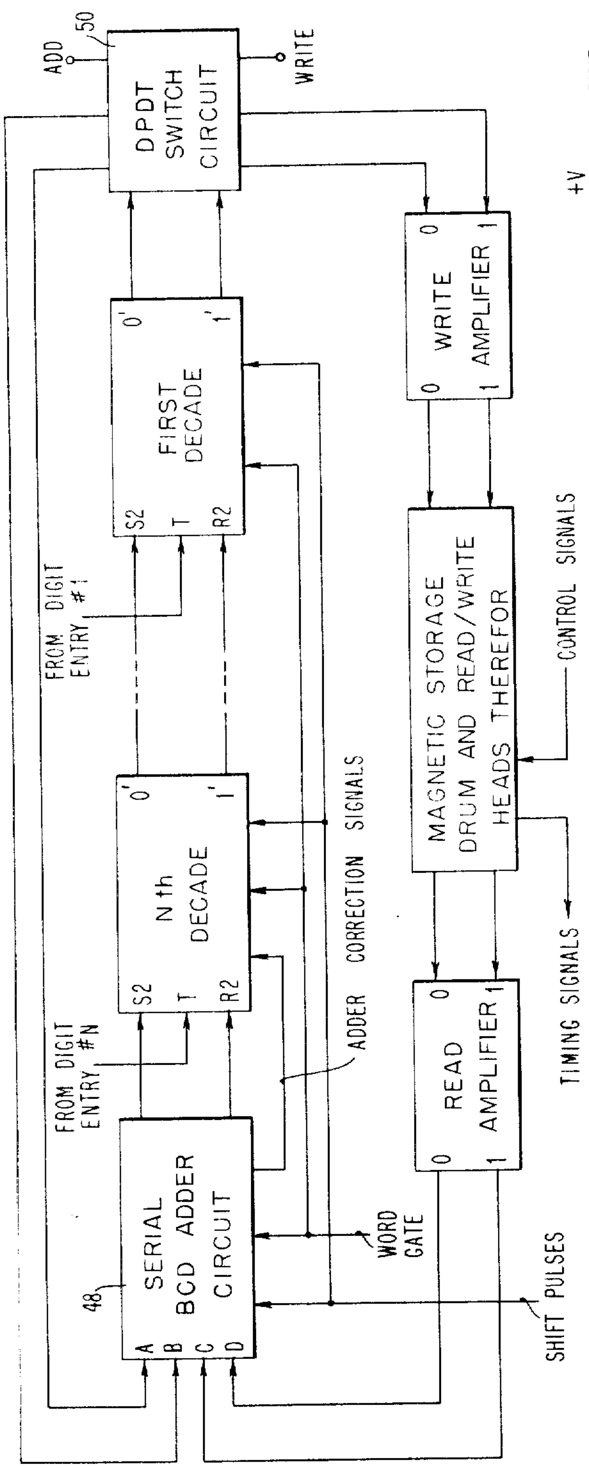
FIG. 8A is a block diagram showing the shift input and output for a second suitable mechanization of the number register circuits of FIG. 2C.

In the serial adder mode of operation, which is illustrated in FIG. 8A, the individual decimal digits from the accounting machine are first counted into their respective decades to form a binary coded decimal equivalent of the number punched on the card, and this number is added to the binary coded decimal number stored at the selected address by a serial binary coded decimal adder circuit 48. During the serial addition operation, the number in the register is shifted out of the right end thereof and applied to inputs A and B of adder 48, which receives the binary coded decimal number from the storage circuits on input terminals C and D, and adds the numbers together bit by bit. The sum of the two numbers is shifted into the register bit by bit during the addition process, whereby the register will contain the sum of the two numbers after the addition cycle is completed. As in the parallel addition mode of operation, this sum can be shifted into the magnetic storage drum as a binary coded decimal number and it can be counted out as a sequentially coded decimal number in the accounting machine code.

Figure 7:
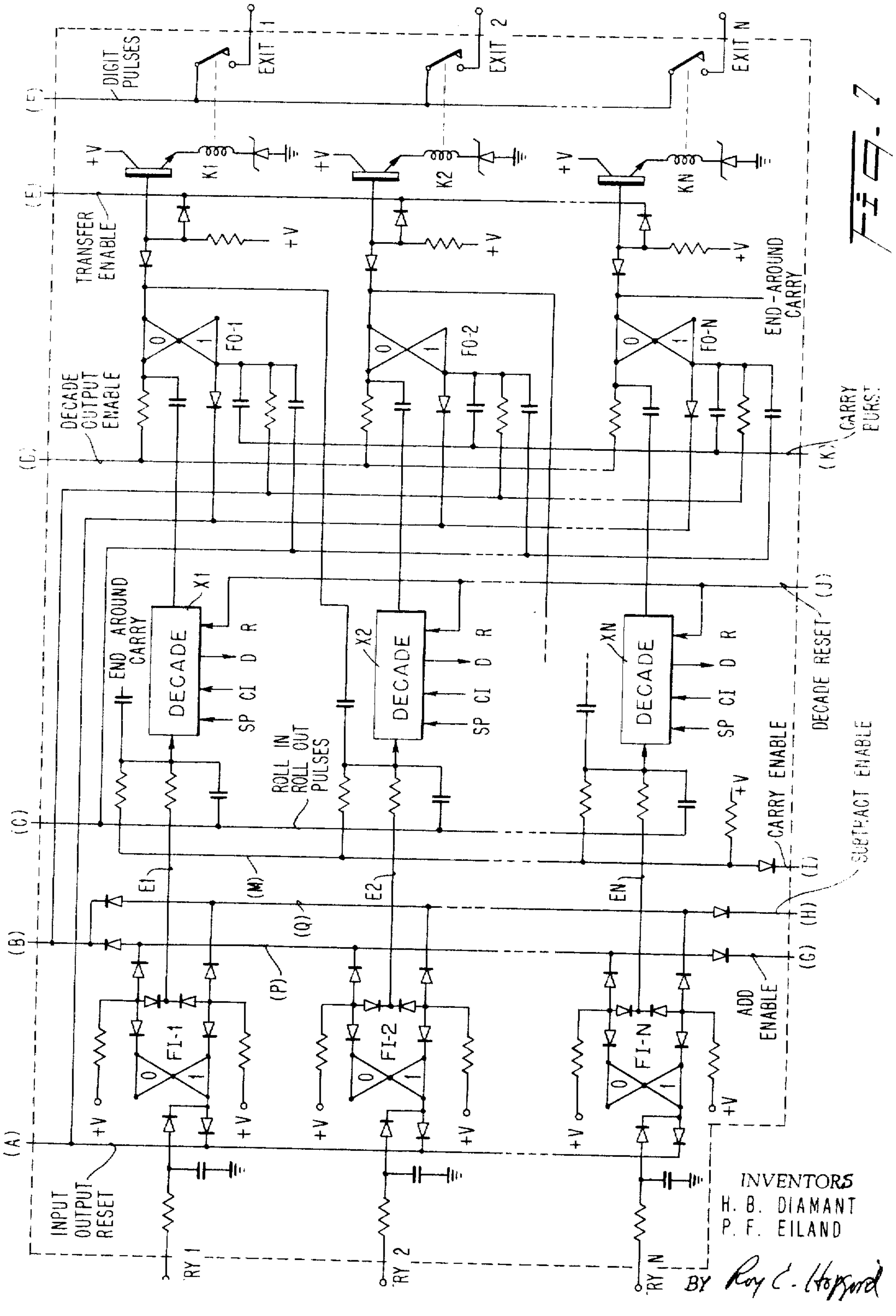
FIG. 7 is a schematic circuit diagram of one suitable mechanization of the number register circuits of FIG. 2C.

FIGS. 6 and 7 are schematic diagrams of one suitable mechanization of synchronizer circuits 41, number control circuits 43, and counter register circuits 45 of FIG. 2C for the parallel addition mode of operation. These three circuit units are, in this particular mechanization, integrated into a unified circuit arrangement which reduces the number of parts required the mechanization thereof. Therefore the circuits of FIGS. 6 and 7 will be described as a unit in the explanation which follows even though they embody three separate functional units in the block diagram of FIG. 2C.

Referring to FIGS. 6 and 7, one suitable mechanization of number register circuits 45 comprises a plurality of decade counters X1 . . . XN (FIG. 7) such as disclosed in 5B. The reset diodes of each decade are coupled in parallel to a common reset conductor (J) which sets all of the counters to their initial or zero state when pulsed. The input to each decade is coupled in parallel to a common pulse input conductor (C) through corresponding coupling capacitors. The roll-in and roll-out pulses shown in FIG. 2B are coupled to conductor (C) to simultaneously advance each of the decade counters during the card digit cycle shown in FIG. 2B. The carry output of each decade is coupled through a coupling capacitor to a corresponding output flip-flop (FO–1 . . . FO–N) which is coupled through a transistor to a corresponding output relay (K1 . . . KN). The output flip-flops are also coupled via a coupling capacitor to the input of the following decade of the counter chain. This is part of a novel counter carry system which will be described in detail in later paragraphs.

The count input to each decade is normally disabled by two positive bias voltages. One positive voltage is coupled in parallel to each decade through a common bias conductor (M), which can be grounded via a carry gate conductor I. The other positive voltage is coupled to each decade through a corresponding input gating conductor (E1 . . . EN) which is coupled to the output circuit of a corresponding input gating flip-flop (FI–1 . . . FI–N). The input gating flip-flops are coupled to a common reset conductor A, which also resets the output flip-flops, and each input gating flip-flop is coupled to a corresponding counter entry hub through an RC filter circuit. After being reset by a negative pulse on reset conductor (A), the input gating flip-flops will be set as soon as a positive pulse is applied to the corresponding counter entry.

Figure 5:
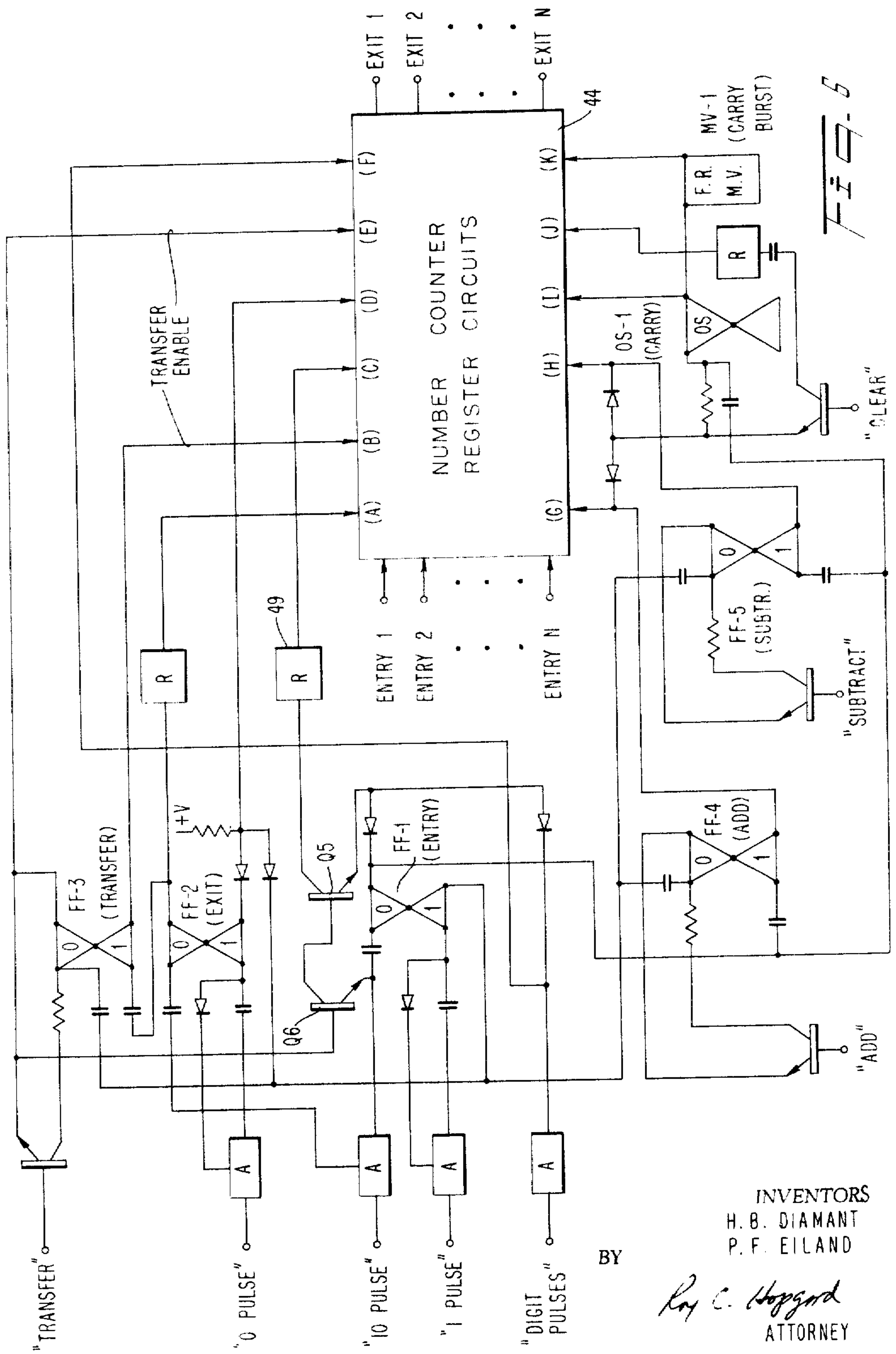
FIG. 5A is a schematic circuit diagram of one suitable counter-shift register stage that can be used in mechanizing the embodiment of FIG. 2C.

The output terminals of each input gating flip-flop are coupled to their corresponding decade input gating conductors (E1 . . . EN) through a symmetrical diode gating circuit which enables the corresponding decade input in one state of the input gating flip-flop and disables it in the other state thereof. The decade input circuits are disabled whenever the corresponding input gating line is at a relatively low positive level. The decade input circuits can also be simultaneously enabled by a ground on carry gate line (I), which switches bias line (M) from a relatively high to a relatively low voltage. Thus it will be apparent that each decade input circuit normally receives two positive back bias voltages both of which must be present to disable the decade input circuit. Each decade normally receives a first voltage of +V from bias line (M) through a first bias resistor and a second bias voltage of +V from the corresponding input gating line (E1 . . . EN). When both of these voltages are present the potential at the decade input terminal is +V, which back biases the decade input diodes (FIG. 5) and disables the decade with respect to negative going pulses applied to either of the two input capacitors thereof. If either of these two bias voltages drops to a relatively low level, however, the voltage at the input terminal of the decade will drop to some lower level because of the voltage divider formed by the first and second bias resistors, and the input diodes will therefore be enabled to respond to negative going input pulses coupled through the two capacitors. Thus the decade input circuits will be enabled whenever either of the two bias input voltages drop from their relatively high positive potential to a relatively low positive potential.

It can be seen that the input gating lines E1 . . . EN will be at relatively high positive level as long as +V is present on the anode of one of the two diodes coupled thereto. Therefore the input gating lines E1 . . . EN will not drop to their relatively low potential until the anodes of both diodes coupled thereto are grounded. One of these diodes will always be grounded by the output of the corresponding flip-flop, depending on its state, and the other can be grounded through a pair of selection conductors (P) and (Q). Conductors (P) and (Q) can be grounded simultaneously by a ground applied to conductor (B) or independently by ground applied to conductors (G) and (H). When conductor (B) is grounded each of the input gating conductor (B) is grounded each of the input gating conductors E1 . . . EN will be enabled immediately, but when conductor (G) or conductor (H) is grounded each of the input gating conductors will be enabled in one state of the corresponding input gating flip-flops and disabled in the other state thereof. Conductor (B) is grounded to select an output mode of operation and conductors (G) or (H) are grounded to select either a direct input of complementary input mode of operation.

The input gating circuit can be more easily understood by describing a simple input and output cycle thereof. Referring to FIGS. 2B and 7, assume that the digit 5 is to be entered into decade X1 in the first accounting machine cycle shown in FIG. 2B. This process proceeds as follows: (1) conductor (G) is grounded so that input gating line E1 will remain disabled until FI–1 is set by an input pulse; (2) the roll in pulses are applied to decade input conductor (C) and the card pulse is applied to carry entry 1; (3) FI–1 gets set by the card pulse, which occurs in coincidence with the 5th digit pulse, and enables the input to decade X1; (4) decade X1 is advanced to a count of 5, by the remaining roll-in pulses.

After the digit 5 has been entered in decade X1, it can be transferred out of counter exit 1 by the following output sequence: (1) conductor (B) is grounded to enable decade X1 immediately, the roll out pulses are applied to conductor (C) to advance the decade in its count, and the digit pulses are applied to conductor (F) to generate an output pulse when relay K1 is actuated; (2) the roll out pulses advance decade counter X1 until it overflows and sets flip-flop FO–1, which energizes relay K1 and closes the contacts leading to counter exit 1. It can be seen that decade X1 will overflow in coincidence with the 5th digit pulse, so that the output of counter exit 1 will duplicate the card pulse entered into decade X1. (3) After decade X1 has overflowed to produce its output pulse, flip-flop FO–1 will be reset by the trailing edge of the roll out pulse, which is applied to the 1 input terminal of FO–1 via conductor (C). It should be noted here that the 1 input terminal of flip-flop FO–1 is enabled during the output sequence by the ground on conductor (B). When the decades are used to add or subtract numbers, this ground is not present and the output flip-flops are used to store the overflow in accordance with a novel counter carry circuit to be described in later paragraphs.

It will be apparent that the above described input and output sequence for decade X1 is also valid for all of the other decades, and that the decades are operated in coincidence to enter their respective input digits and to develop their respective output digits. It will also be apparent that the digits received by the counter entry hubs can be stored in nine's complement form, rather than in direct form, by grounding conductor (H) instead of conductor (G). In this case the decade inputs would all be initially enabled, and they would be advanced in their count by all of the roll in pulses that preceded the input pulse to the corresponding counter entry rather than vice versa. This selection between direct entry and nine's complement entry is provided to adapt the decades for either addition or subtraction. The decades are coupled together by a novel carry circuit to form a counter circuit capable of adding one N-digit decimal number to another N-digit decimal number. Each decade, of course, corresponds to one digit of the numbers in question, and one of the numbers is shifted into the decades from the computer memory circuits as described in connection with FIG. 5C. The number applied to the counter entry hubs is then algebraically added to the number previously shifted into the decades as explained in connection with FIG. 5C. If the decade input gating network is switched to its direct mode of operation, by grounding conductor (G), the two numbers will be added together. If it is switched to its nines complement mode of operation, by grounding conductor (H), the two numbers will be subtracted, as will be readily apparent to those skilled in the art. During this addition or subtraction operation, which is carried out digit by digit, one or more of the decades may be driven through their zero state and start a new count. This will produce a carry output signal such as used in the output mode of operation to develop an output pulse. In addition or subtraction, however, these carry output signals are stored in the output flip-flops for use in a novel carry operation, which is performed after the addition or subtraction by digits has been completed. The output flip-flops, it should be noted, are disabled at their 1 input terminal during the addition or subtraction process by the absence of a ground on conductor (B). Therefore, after they have been set by a carry output signal from the corresponding decade they will remain set until the carry operation is initiated at the end of the addition by digits.

The carry operation is performed by first grounding conductor (B) to simultaneously enable the input to all of the decades and output flip-flops, and then applying a carry burst of N or more pulses to conductor K. The first pulse of this series will reset all of the output flip-flops which have been set by an overflow, thus generating a carry input signal which is entered into the input of the next decade in the counter chain. If the next decade happens to be in its ninth state, this will produce another carry output signal which will set the corresponding output flip-flop. This flop-flop will be reset by the next pulse of the carry burst to generate another carry input signal which is applied to the next decade. This process is repeated until all of the carrys have been executed, at which time all of the output flip flops will be reset and any subsequent carry burst pulses will have no effect on the circuit. It will be apparent to those skilled in the art that at least N carry pulses will be required, to cover the case where every decade overflows in response to the carry signals, but that not all of these pulses will be used in every situation.

FIG. 6 shows one particular mechanization of synchronizer circuits 41 and counter control circuits 45 for use in connection with the above described mechanization of counter register circuits 44. Referring to FIG. 6, the entry gate shown in FIG. 2B is generated by an entry flip-flop FF–1 and the exit gate is generated by an exit flip-flop FF–2. These flip flops are triggered by the "10," "split column 1," and "split column 0" pulse inputs from the accounting machine in accordance with the timing indicated in FIG. 2B. These pulses are applied to the input terminals of FF–1 and FF–2 via corresponding pulse amplifiers and coupling capacitors. The roll-in and roll-out pulses, which are applied to a common conductor (C), are developed by a diode AND circuit coupled between entry flip-flop FF–1 the digit pulse input amplifier. The pulse output of this AND circuit is differentiated in the input to a non-inverting amplifier 49 which produces the relatively narrow roll-in and roll-out pulses shown in FIG. 2B. The roll-out pulses are produced by adding the "10" input pulse to the nine digit input pulses via a transistor Q5, whose base is coupled to the "10" input pulse via transistor Q6, which is normally back-biased by a transfer flip-flop FF–3. When FF–3 is set, in preparation for an output cycle in counter register circuits 44, transistor Q6 is forward biased to add the "10" pulse to the digit pulses so as to produce the ten roll out pulses shown in FIG. 2B. The output of transfer flip-flop FF–3 is also used to ground conductor (B), whose function was described previously, and to place a positive voltage on conductor (E), which enables the counter output relay circuits shown in FIG. 7. Transfer flip-flop FF–3 is reset automatically after an output cycle by the trailing edge of the exit gate output of FF–2. It will be noted that conductor (D), which is coupled to the 0 input terminal of output flip flops FO–1 . . . FO–N (FIG. 7), is enabled by a ground applied through a diode OR gate from entry gate flip-flop FF–1 or exit gate flip-flop FF–2.

The add or subtract modes of counter operation described above are selected by add and subtract flip flops FF–4 and FF–5, which are set by the leading edge of the entry gate whenever they are enabled by add and subtract input signals applied through corresponding transistor amplifiers and which are reset automatically by the trailing edge of the entry gate after they have been set by the leading edge thereof. Flip-flops FF–4 and FF–5 apply grounds to conductors (G) or (H), in accordance with the desired mode of operation, to select the previously described addition or subtraction modes of operation in counter register circuits 44. The ground on conductors (G) or (H) is also coupled, through a diode OR circuit, to the input terminal of a one-shot multivibrator OS–1, which will be triggered by the trailing edge of the entry gate whenever its input is enabled by a ground on conductor (G) or (H). One-shot multivibrator OS–1 initiates the carry operation described above, which must follow each addition or subtraction operation. When conductors (G) and (H) are both ungrounded, the carry operation can be initiated by a "clear" input signal which is applied through a transistor amplifier to the input terminal of OS–1 and also through a non-inverting amplifier to decade reset conductor (J).

When OS–1 is triggered, it produces an output ground which is applied to conductor (I) to simultaneously enable all of the decade inputs so that they can receive carry input signals. This ground is also used to enable a free running multivibrator MV–1, which produces the carry burst on conductor (K) as described previously. The output pulse duration of OS–1 must be long enough to allow N or more carry pulses to be generated by MV–1 to produce the required carry burst for counter register circuits 44.

It should be noted that the pulse input amplifiers of the above described mechanization of circuits 41 and 45 are arranged to derive their emitter potential from the flip-flops whose state then are adapted to control. This simplifies the circuitry and increases its reliability of operation. It should also be noted that the number of circuit elements has been reduced to a minimum in this mechanization by combining signals wherever possible and by assigning multiple functions to the individual signals.

Figure 8B:
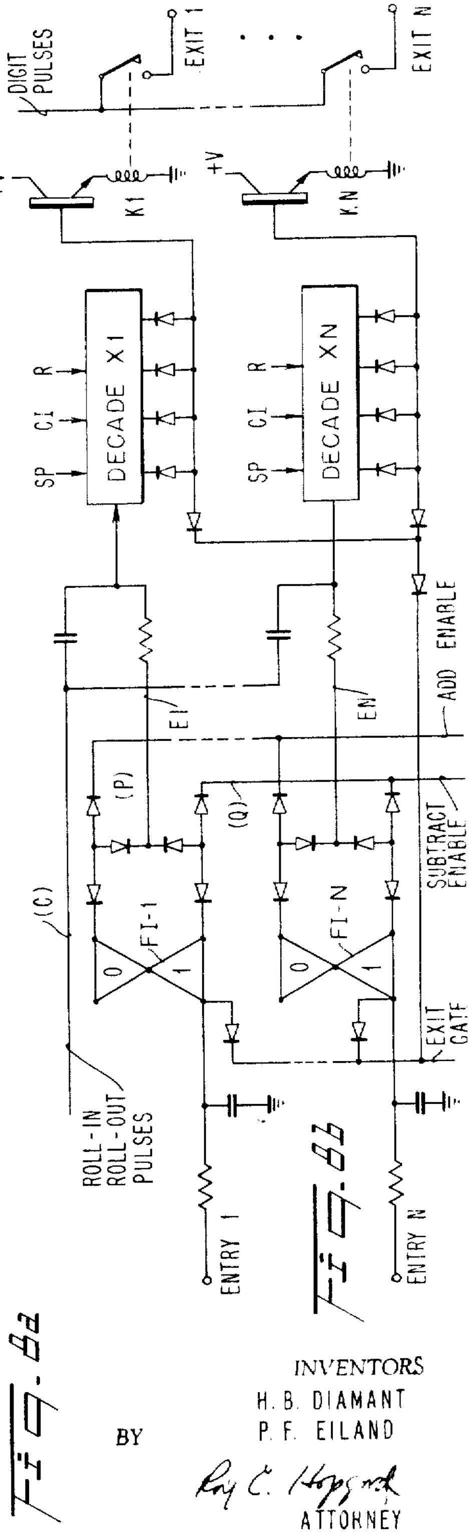
FIG. 8B is a schematic circuit diagram of the count input and output for the number register circuits of FIG. 8A.

In the serial addition mode of operation, the output circuit of decades XI through XN is considerably simplified, as shown in FIG. 8B. This simplification results from performing the addition operation in adder circuit 48 (FIG. 8A) instead of in the decades, thereby eliminating the need for the above described carrying circuits. As shown in FIG. 8B, output relays K1 . . . KN are driven by the amplified output of a diode AND gate circuit which is coupled to each flip-flop in the decade and to an output enable conductor (R), which is enabled by the exit gate. In this circuit arrangement, relays K1 . . .KN are each actuated when all of the flip-flops in the corresponding decades are in their zero state and an exit gate is applied to output enable conductor (R). This exit gate is also used to reset entry flip-flops FI–1 through FI–N, as will be apparent to those skilled in the art. In spite of these differences in the output circuit, however, the basic output sequence of this serial addition mechanization is the same as that of the parallel addition mechanization. In both cases, the decades are driven through their counting cycle by roll-out pulses and the output relays K1 . . . KN are actuated when their corresponding decades reach the end of their count. Since the number of roll-out pulses required to bring a decade to the end of its count is dependent on the number previously stored in the decade, each output relay will be actuated on the digit pulse which corresponds to the binary coded decimal number stored in its respective relay.

The basic decade counter input and output sequences described above in connection with FIGS. 7 and 8B are particularly important features of this invention because they allow the registers to receive inputs in the accounting machine code or in the memory code, which is an entirely different code, and to add these two differently coded numbers together, and to read out the sum either in the memory code or in the accounting machine code. The basic timing sequence shown in the chart of FIG. 2B is a part of the decade counter input-output sequence, and so is the shift input sequence described in connection with FIGS. 5C and 8A, for reasons that will be apparent to those skilled in the art. It should be understood, of course, that the basic input-output sequence is not limited to the specific examples disclosed, and that the basic input-output structure is not limited to the specific mechanizations disclosed by way of example. In its most basic form, however, the counter-shift register and its input-output means comprises the most important novel feature of this invention.

Any suitable serial binary coded adder circuit can be used in the serial addition mechanization of this invention, but it is preferable to use the novel serial adder and multiplier circuit disclosed in our copending patent application Serial Number 198,796, entitled "Serial Adder and Multiplier," which was filed on May 31, 1962. This particular adder circuit utilizes adder correction signals which are coupled to the Nth decade of the register to correct for certain unallowed code numbers as explained more fully in said copending application. The serial addition mechanization also utilizes a double pole double throw switch circuit 50 which routes the shift output of the first decade either to inputs A and B of adder circuit 48 or to the writing circuit depending on whether the shift operation is an addition or a transfer of information from the register to the magnetic storage drum. The position of this switch circuit, which can be any suitable prior art gating circuit, is controlled by pulses applied to the "add" and "write" hubs of the memory attachment program board.

The memory attachment program board can comprise any suitable structure, but it is preferable to use a structure which is physically and electrically compatible with the accounting machine program board. In the preferred mechanization of this invention, we use what we call a "piggy back" program board, which is adapted to be plugged into the accounting machine program board and to receive the jumper wires that are normally used to program the accounting machine. All of the connections required between the memory attachment and the accounting machine are made by standard jumper wires connected between existing hubs on the accounting machine program board and the hubs provided on the piggy back program board, which can be plugged into any desired location on the accounting machine program board. No modifications are required in the structure or operating cycle of the accounting machine when the novel memory attachment of this invention is used therewith. The programmer simply plugs the piggy-back program board into the accounting machine program board and wires up the two program boards for the desired program in accordance with standard programming techniques and equipment.

From the foregoing description it will be apparent that this invention provides a novel memory attachment which can be used to augment the memory capacity of prior art accounting machines and to extend their range of functions without requiring any modification in the accounting machines or in their operating cycle. It will also be apparent that this invention provides a novel data processing system, and novel circuits therefore, which is operable to receive, store, and perform logical operations on sequentially coded input signals such as generated by accounting machines or the like. And it should be understood that this invention is by no means limited to the specific uses, operating sequences, or structure disclosed herein by way of example. Many modifications can be made in the disclosed structure without departing from the basic teaching of this invention, which includes all modifications falling within the scope of the following claims.

We claim:

1. A data input/output circuit for receiving and storing decimal input signals and binary input signals and for developing decimal output signals and binary output signals, said data input/output circuit comprising a plurality of decade counter/shift register stages each having a count input terminal, a count overflow output terminal, a shift pulse input terminal, a shift information input terminal, and a shift information output terminal, said decade counter/shift register stages being coupled together in cascade with the shift information output of each stage coupled to the shift information output of the preceding stage and the shift information output of each stage coupled to the shift information input of the succeeding stage, a shift pulse source coupled to the shift pulse input of each of said stages, means for applying binary input signals to the shift information input terminals of the first stage of said cascaded register circuits to enter binary signals thereinto, a plurality of input gating circuits each coupled to the count input of a corresponding decade counter stage, means coupled to each

BEST AVAILABLE COPY of said input gating circuits for developing a train of pulses corresponding in number to a predetermined decimal digit to enter decimal signals into said register, a plurality of output gating circuits each coupled to the count overflow output of a corresponding decade counter stage, each of said output gating circuits being adapted to produce an output signal in response to an overflow output signal from the corresponding decade, and means for applying a train of roll-out pulses to each of said input gating circuits to develop decimal output signals in said output gating circuits.

2. The combination defined in claim 1 and also including a carry storage circuit coupled to the count overflow output of each of said decade counter/shift register stages and to each of said input gating circuits, said carry storage circuit being adapted to store the count overflow output signal of each decade counter/shift register stage and to apply said count overflow output signal to the count input of the succeeding decade counter/shift register stage.

3. The combination defined in claim 1 and also including a serial binary adder circuit coupled between the shift information input terminals of the first stage of said cascaded register circuits and the shift information output terminals of the last stage thereof, said serial adder circuit being adapted to receive binary input signals and to add said binary input signals to binary output signals shifted out of the last stage of said cascaded register circuits and to shift the sum of said two binary signals into the first stage of said cascaded register circuits.

4. An electronic memory attachment for use in combination with a data processing system containing (1) means for producing sequentially coded digital word signals and sequentially coded digital address signals corresponding thereto, (2) means for producing reference signals defining the code of said sequentially coded digital word and address signals, (3) means for actuating said data processing system in accordance with a predetermined program of operation, and (4) means for producing timing signals at predetermined steps in said program of operation; said data processing system having at least two reading stations for reading the same word signals at spaced time intervals said electronic memory attachment comprising:

(A) a word signal input circuit for receiving said sequentially coded digital word signals;

(B) an address signal input circuit for receiving said sequentially coded digital address signals;

(C) a synchronizer circuit for receiving said reference signals and correlating the operation of said word and address signal input circuits with the code defined thereby;

(D) a word storage circuit for receiving and storing digital signals at a plurality of storage locations therein, said word storage circuit being coupled to said word input circuit to receive said digital word signals;

(E) a location selector circuit for selecting one of said storage locations in response to an address signal, said location selector circuit being coupled to said address input circuit to receive said digital address signals;

(F) an information retrieval circuit coupled to said location selector and word storage circuits for reproducing the digital signals stored in any one of said storage locations; and (G) control circuit means for receiving said timing signals and actuating said input, word storage, location selector, and information retrieval circuits in accordance with a predetermined program of operation which is synchronized with the program of said data processing system to enter the output derived from the information retrieval circuit in said data processing system at the end of the first reading of the word signals and before the second reading, whereby said electronic memory attachment augments the functions of said data processing system without interfering with its normal program of operation.

5. The combination defined in claim 4 and also including (H) an addition circuit coupled to said word signal input circuit, said word storage circuit, and said information retrieval circuit, said addition circuit being operable to add digital word signals received by said word signal input circuit to digital signals stored in said word storage circuit, said control circuit being coupled to said addition circuit and being operable to actuate said addition circuit at a predetermined step of said program of operation.

6. An electronic memory attachment for use in combination with a data processing system containing (1) means for producing sequentially coded digital word signals and sequentially coded digital address signals corresponding thereto; (2) means for producing reference signals defining the code of said sequentially coded digital word and address signals, (3) means for actuating said data processing system in accordance with a predetermined program of operation, and (4) means for producing timing signals at predetermined steps in said program of operation said data processing system having at least two reading stations for reading said word signals at spaced time intervals; said electronic memory attachment comprising:

(A) a word signal input/output circuit for receiving said sequentially coded digital word signals and for producing sequentially coded digital output signals;

(B) an address signal input/output circuit for receiving said sequentially coded digital address signals and for producing sequentially coded digital output signals;

(C) a synchronizer circuit for receiving said reference signals and correlating the operation of said word and address signal input circuits with the code defined thereby;

(D) a word storage circuit for receiving and storing digital signals at a plurality of storage locations therein;

(E) a location selector circuit for selecting one of said storage locations in response to an address signal, said location selector circuit being coupled to said address input circuit to receive said digital address signal;

(F) a read/write circuit for entering digital signals into selected storage locations of said word storage circuit and for reproducing the digital signals stored in selected locations therein, said read/write circuit being coupled between said word signal input/output circuit and said word storage circuit; and (G) control circuit means for receiving said timing signals and actuating said input, word storage, location selector, and read/write circuits in accordance with a predetermined program of operation which is synchronized with the program of said data processing system, to enter the output derived from said memory attachment in said data processing system at the end of the first reading of the word signals and before the second reading whereby said electronic memory attachment augments the functions of said data processing system without interfering with its normal program of operation.

7. The combination defined in claim 6 wherein said address signal input/output circuit comprises an address register containing input means for receiving sequentially coded address signals from said data processing system and output means for applying sequentially coded output signals to said data processing system.

8. The combination defined in claim 7 wherein said word signal input/output circuit comprises a counter circuit containing input means for receiving sequentially coded word signals from said data processing system and from said read/write circuit and output means for apply-

BEST AVAILABLE COPY ing sequentially coded output signals to said data processing system and to said read/write circuit.

9. The combination defined in claim 8 wherein said counter circuit is adapted to add digital word signals received from said data source to digital word signals received from said read/write circuits.

10. The combination defined in claim 6 wherein said sequential reference signals comprise a train of 10 spaced electrical pulses each associated with one of the decimal digits, and wherein said word and address signals each comprise a decimal number containing an ordered plurality of decimal digits, each decimal digit of said decimal number being represented by a single electrical pulse which occurs in time coincidence with a corresponding one of said 10 spaced electrical pulses, and wherein said timing signals include a start pulse at the beginning of said train of pulses and a stop pulse at the end of said train of pulses.

11. The combination defined in claim 10 wherein said synchronizer circuit is operable to produce a train of spaced electrical roll-in pulses each occurring in time coincidence with a corresponding one of said 10 spaced electrical pulses.

12. The combination defined in claim 11 in which said word signal input/output circuit comprises a plurality of decade counter/shift register states each having a count input terminal, a count overflow output terminal, a shift pulse input terminal, a shift information input terminal, and a shift information output terminal, said decade counter/shift register stages being coupled together in cascade with the shift information input of each stage coupled to the shift information output of the preceding stage and the shift information output of each stage being coupled to the shift information input of the succeeding stage, the shift pulse input of each stage of said cascade circuit being coupled to said read/write circuit, the shift information input of the first stage of said cascade circuit and the shift information output of the last stage thereof being coupled to said read/write circuit, a plurality of input gating circuits each coupled to the count input of a corresponding decade counter stage, each of said input gating circuits being coupled to said synchronizer to receive said roll-in pulses and being adapted to receive a corresponding single electrical pulse representing a decimal digit, each of said input gating circuits being adapted to gate into the corresponding decade a number of roll-in pulses corresponding to the decimal digit signified by said single electrical pulse, whereby a decimal number containing an ordered plurality of decimal digits can be shifted into said registers from said read/write circuits or counted into said registers from said input gating circuits.

13. The combination defined in claim 12 wherein said synchronizer circuit is adapted to produce a train of spaced electrical roll-out pulses each occurring in time coincidence with a corresponding one of said 10 spaced electrical pulses and an electrical exit gate extending between start pulse and said stop pulse, and also including a plurality of output gating circuits each coupled to the count overflow output of a corresponding decade counter/shift register stage, each of said output gating circuits being coupled to said synchronizer circuit to be enabled by said exit gate, each of said output gating circuits being operable to produce an output pulse in response to an overflow output signal from the corresponding decade counter/shift register stage, said roll-out pulses being coupled to each of said input gating circuits, whereby a decimal number containing an ordered plurality of decimal digits can be shifted out of said registers into said read/write circuits or counted out of said registers into said output gating circuits.

14. The combination defined in claim 13 and also including a carry storage circuit coupled to the count overflow output of each of said decade counter/shift register stages, and to each of said input gating circuits, said carry storage circuit being adapted to store the count overflow output signal of each decade counter/shift register stage and to apply said count overflow output signal to the count input of the succeeding decade counter/shift register stage.

15. The combination defined in claim 14 wherein said control circuit is adapted to operate in accordance with an input program sequence in which (A) a binary number is shifted into said register from said storage circuits by way of said read/write circuit, (B) a sequentially coded decimal number is added to said binary number in said registers by means of said roll-in pulses applied to said input gating circuits, (C) the overflow output signals resulting from the addition process of step (B) are applied to the count input of the succeeding decade stage by way of said carry storage circuit, and (D) the sum of the two numbers is shifted into said storage circuits by way of said read/write circuits.

16. The combination defined in claim 15 wherein said second control circuit is adapted to operate in accordance with an output program sequence in which (A) a binary number is shifted into said registers from said storage circuits by way of said read/write circuits, and (B) a sequentially coded equivalent of said binary number is developed in said output gating circuit by means of said roll-out pulses applied to said input gating circuits.

17. The combination defined in claim 13 and also including a serial binary adder circuit coupled between the shift information input of the first stage in said cascaded register circuits and said read/write circuits, said serial binary adder circuit being coupled to the shift information output of the last stage in said cascaded register circuits, and said serial binary adder circuit being adapted to add together a first binary number shifted out of the last stage of said cascaded register circuit to a second binary number shifted into said serial binary adder from said storage circuits by way of said read/write circuits and shift the sum of said two binary numbers into the first stage of said cascaded register circuits.

18. The combination defined in claim 17 wherein said control circuit is adapted to operate in accordance with an input program sequence in which (A) a sequentially coded decimal number is entered into said register by means of said roll-in pulses applied to said input gating circuits, (B) the number entered into said register is added to a number stored in said storage circuits and the sum thereof is shifted into said register by way of said serial binary adder, and (C) the sum of said two numbers is shifted into said storage circuits by way of said read/write circuits.

19. The combination defined in claim 18 wherein said control circuit is adapted to operate in accordance with an output program sequence in which (A) a binary number is shifted into said registers from said storage circuits by way of said read/write circuits, and (B) a sequentially coded equivalent of said binary number is developed in said output gating circuits by means of said roll-out pulses applied to said input gating circuits.

References Cited by the Examiner

UNITED STATES PATENTS

| | | | |
|---|---|---|---|
| 2,834,544 | 5/1958 | Daino et al. | 235—61.6 |
| 2,901,168 | 8/1959 | Burrell et al. | 235—61.6 |
| 2,939,120 | 5/1960 | Estrems et al. | 340—172.5 |
| 3,018,959 | 1/1962 | Thomas | 340—172.5 |
| 3,025,499 | 3/1962 | Evans et al. | 340—172.5 |
| 3,056,110 | 9/1962 | Cypser | 340—172.5 |
| 3,091,390 | 6/1963 | Hassett | 235—61.9 |

ROBERT C. BAILEY, *Primary Examiner.*

MALCOLM MORRISON, *Examiner.*

W. M. BECKER, P. HENON, *Assistant Examiners.*